H. S. HART.

DOOR OPERATING MECHANISM.

APPLICATION FILED NOV. 26, 1919.

Reissued Jan. 6, 1920.

14,785.

2 SHEETS—SHEET 1.

Witness:
R Burkhardt

Inventor:
Harry S Hart,
By Milkinson & Hupley
Attys

H. S. HART.

DOOR OPERATING MECHANISM.

APPLICATION FILED NOV. 26, 1919.

Reissued Jan. 6, 1920.

14,785.

2 SHEETS—SHEET 2.

Witness:
R Burkhart

Inventor:
Harry S Hart,
By Wilkinson & Huxley
Attys.

UNITED STATES PATENT OFFICE.

HARRY S. HART, OF CHICAGO, ILLINOIS, ASSIGNOR TO NATIONAL DUMP CAR CO., OF CHICAGO, ILLINOIS, A CORPORATION OF MAINE.

DOOR-OPERATING MECHANISM.

14,785. Specification of Reissued Letters Patent. Reissued Jan. 6, 1920.

Original No. 1,318,445, dated October 14, 1919, Serial No. 285,216, filed March 26, 1919. Application for reissue filed November 26, 1919. Serial No. 340,938.

*To all whom it may concern:*

Be it known that I, HARRY S. HART, a citizen of the United States, residing at Chicago, in the county of Cook and State of Illinois, have invented certain new and useful Improvements in Door-Operating Mechanism, of which the following is a specification.

This invention relates to door operating mechanism particularly in connection with general service cars.

The objects of the invention are to provide a simple and efficient door operating mechanism which is positive in its action, so arranged that no strain is placed upon the mechanism tending to distort it, thus minimizing repairs; to provide a device which can be easily operated; and provide an operating device so arranged as to increase the efficiency of the car in unloading.

General service cars, as is well known, have their flat bottoms composed largely of drop doors from which the dumpable lading is discharged. It has been customary in the past to provide operating mechanisms for these doors by means of which a plurality of doors can be closed and opened simultaneously. The classes of operating mechanisms heretofore used, generally speaking, are of two kinds; those which employ a winding shaft connected by chains or flexible elements to the doors, and those in which the shaft placed beneath the doors operates directly to raise the same.

The first class of device is open to the objection that, owing to the weight of the doors, the chains or flexible elements connecting the doors to the shaft are apt to stretch or kink unequally, so that some of the doors cannot be fully closed, making it impossible to transfer the load from the chain to the shaft through devices usually employed. Cars having these chain and shaft operated doors are open to the further objection that the chains are in the path of the outcoming load as it is discharged, thus hindering the free flow of the material from the car.

Cars of the second class, that is, those employing the shaft as the direct operating member for the doors, while free from the last named objection, are apt to become defective because of the torsional strains imposed upon the shafts in closing the doors. These shafts extend approximately one-half the length of the car and are operated from the end of the car by rolling the shaft back and forth beneath the doors. The shaft ends farthest from the ends of the car, owing to the torsional strains upon the shaft, will sometimes become distorted, so that certain of the doors will not be fully closed. This is especially true if small amounts of material are left upon the doors, requiring the exercise of unusual effort to compel the shaft to move into fully closed position.

My new door operating mechanism disclosed in this application overcomes the objections to both types of mechanism, there being no chains to interfere with the load or to become stretched, and there being no shaft for directly raising or supporting the doors. The closing of the doors by lifting each door singly can be done with less effort, and probably in less time, than a complete section can be raised by the old devices, while the dropping of the doors may take place in sections.

Another advantage in lifting the doors singly is that the operator sees any objects of material which may be left on the door or underframe requiring cleaning off. When the doors are raised from the end of the car as is now commonly done, it is not always possible to notice these things, the result being that attempts are frequently made to close the doors when particles of coal are interposed between the edge of the door and the adjacent underframe member, thus putting a great strain upon the operating mechanism in attempting to force doors into fully closed position.

The invention is illustrated on the accompanying sheets of drawings, in which—

Figure 1:
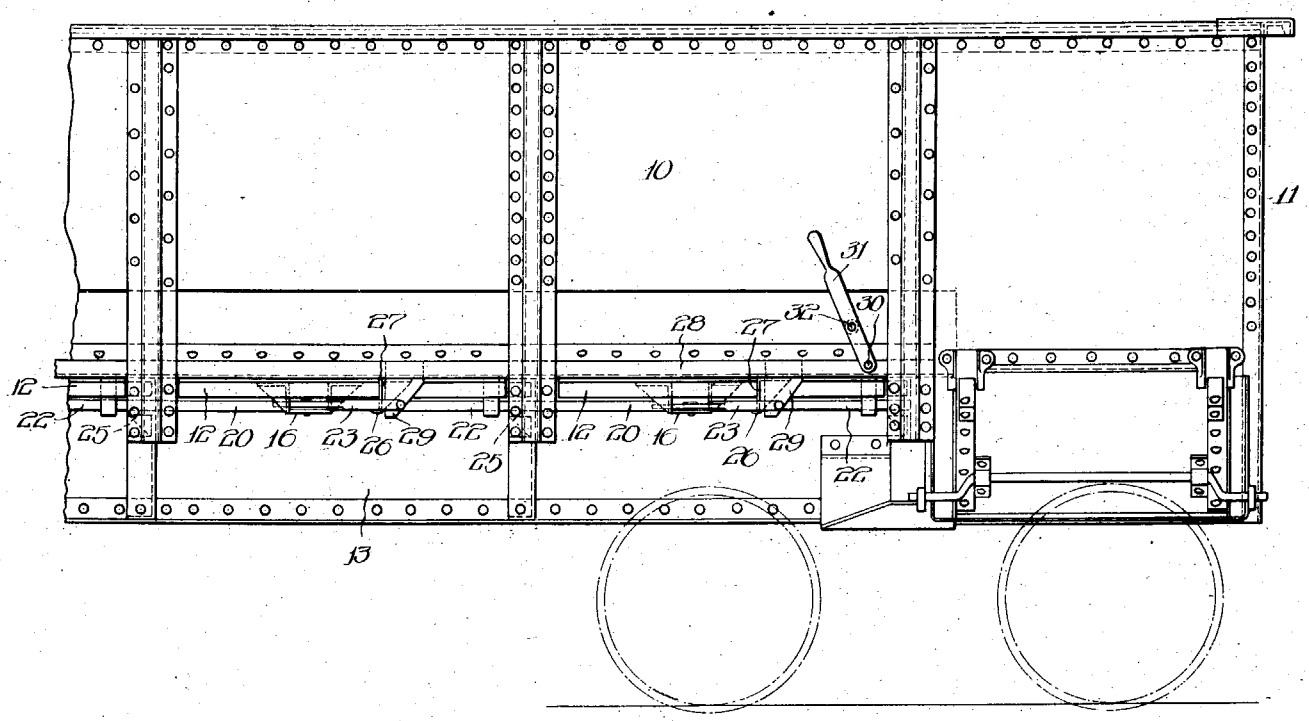
Figure 1 is a fragmentary side elevation of a general service car embodying my invention.

The various novel features of my invention will be apparent from the following description and drawings and will be particularly pointed out in the appended claims.

Referring to the figures of the drawings, it will be noted that I have shown a general service car having sides 10, ends 11, and a floor composed largely of dump doors 12, which are pivotally connected at their inner ends to the center sill structure 13, the frame-work of the car including transverse supporting and strengthening members 14, which are provided with stop members 15 upon which the dump doors 12 rest when in an open position.

This invention has to do primarily with the door operating mechanism. Having in mind the disadvantages of door operating devices heretofore employed and the advantages of this present door operating mechanism, as hereinabove set forth, attention is called to the fact that each of the dump doors is raised from an open position into a closed position separately and independently of any other one of the doors. Secured to the bottom of each of the dump doors 12 is a bracket 16, pivotally connected to the middle portion of which at 17 is a lever 18, to one end of which is pivotally connected, at 19, a locking member 20. Pivotally connected at 21 to an intermediate point of the lever is another locking member 22. The outer end of the member 18 has a handle portion 23, whereby the locking members 22 may be moved toward and away from a locking position. The ends of the locking members 20 and 22, respectively, are adapted to pass into recesses or locking pockets 24 formed in castings 25 secured to the frame members 14.

Figure 2:
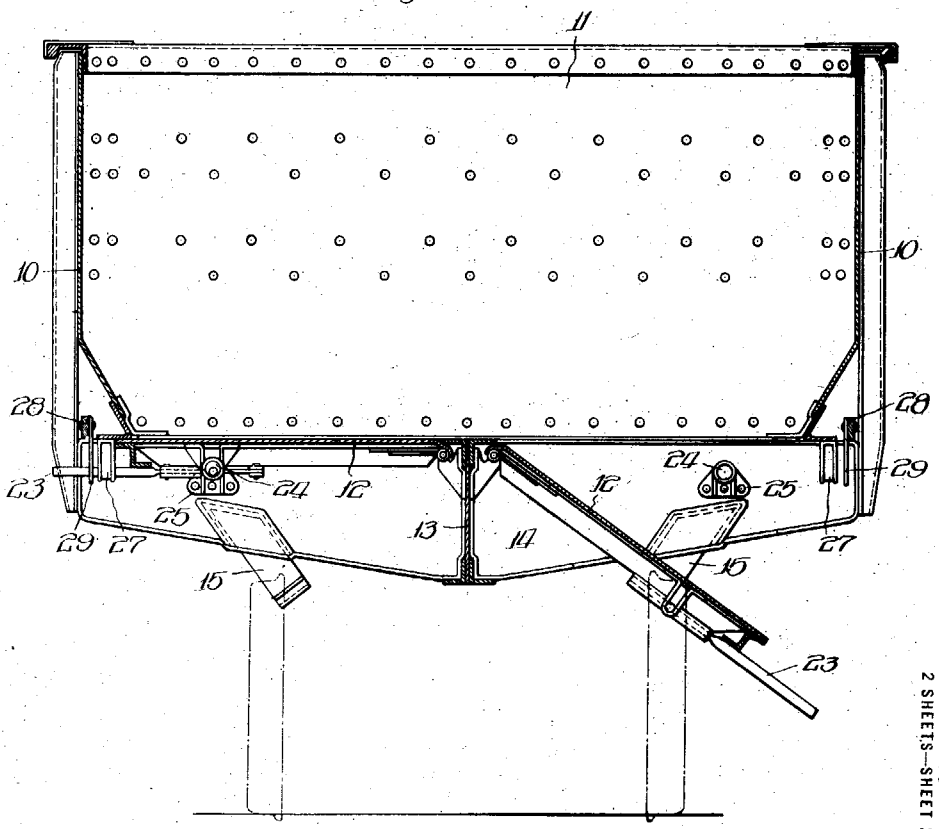
Fig. 2 is a transverse sectional view of the same.
Figure 3:
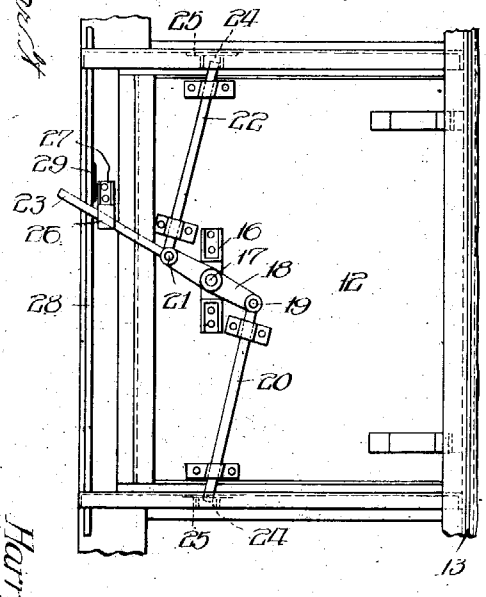
Fig. 3 is a detail bottom plan view of a dump door equipped with my operating mechanism.

Let it be assumed that all of the dump doors 12 are in their open position, as shown at the right hand of Fig. 2. To raise each one of these doors individually to its closed position, the same is accomplished by grasping the handle 23 and lifting the same upwardly, it being understood that the handle 23 is in its central position, with the locking members 20 and 22 in an unlocked position. When each door has been raised into its closed position, the handle 23 may be swung in one direction to cause the locking members 20 and 22 to move into the locking openings 24 of the brackets 25, whereupon the doors will be locked or supported in their closed position, this locking movement of the handle 23 being the final locking movement. The handle 23 also takes a locking position, in which it overlies a projecting lip 26 of a bracket 27 secured to the frame of the car. Each door, therefore, when locked in closed position, is locked at three points, at the brackets 25 and bracket 27.

While there are many advantages in raising the doors into a closed position individually and locking said doors in closed position individually, as hereinabove set forth, there are advantages also in releasing a plurality of the doors simultaneously for dumping purposes. To this end, I have provided means for releasing a plurality of doors simultaneously, and preferably there are four releasing means for each car, that is, one releasing means for each quarter of the car. This releasing means takes the form of a longitudinally extending and longitudinally movable bar member 28, slidably supported upon the outer ends of the frame member 14, each of said bar members having a plurality of downwardly extending arms or projections 29, which are adapted to move the handles 23 and the locking members 20 and 22 connected thereto from a locking position into an unlocking position, for releasing a plurality of doors simultaneously for dumping purposes.

As shown particularly in Fig. 1, it will be noted that the longitudinally extending bar member 28 has pivotally connected thereto, at 30, a control lever 31, which is pivotally supported at 32, intermediate its ends. As shown in said figure, the dump doors are all locked in closed position with the handle 23 in each case overlying the supporting lip 26, the unlocking projection 29 secured to the bar member 28 in each case lying in juxtaposition to the handle 23. If now the control lever 31 is moved in a clockwise direction, the bar member 28 will be moved to the left, causing its projections 29 to move the handles 23 to the left, out of supporting engagement with the supporting lips 26, moving the locking members 20 and 22 out of engagement with the brackets 25 and into unlocking position, whereupon the dump doors in that section of the car controlled by the releasing lever 31 will drop into an open position simultaneously for dumping purposes.

The door operating mechanism has all of the advantages hereinabove mentioned in connection with raising the dump doors into closed position individually and locking the said dump doors individually without the use of chains or shafts as heretofore used. Furthermore, these doors are not supported in their closed position by chains or shafts, as has been the case heretofore, chains and shafts being eliminated in the construction here disclosed; and at the same time a plurality of doors are released to drop into an open position simultaneously by mechanism which is simple and effective, the door operating mechanism being adapted to meet all of the requirements under service conditions.

It is my intention to cover all modifications of the invention falling within the spirit and scope of the following claims.

I claim:

1. In a general service car having a plurality of doors, means for closing said doors individually, and means common to a plurality of the doors and movable lengthwise of the car for releasing said doors.

2. In a general service car having a plurality of doors, means for closing said doors individually, means for locking said doors individually, and means common to a plurality of doors and movable lengthwise of the car for unlocking the doors simultaneously.

3. In a general service car having a plurality of doors, a handle on each of said doors for moving said doors into a given position individually and whereby said doors may be locked in said position, and means movable lengthwise of the car operatively connected with each of said handles for moving a plurality of said handles into an unlocked position whereby a plurality of said doors may be released simultaneously.

4. In a general service car having a plurality of doors, a handle on each of said doors for moving said doors into a given position individually and whereby said doors may be locked in said position, the locking action by said handle being the final locking action, and a slidably mounted member having portions adapted to engage and release said handles for releasing a plurality of said doors simultaneously.

5. In a general service car having a door, a lever connected thereto, a locking member pivotally connected to said lever and movable into locking and unlocking positions by operation of said lever, said door being raised individually and locked through movement of said lever, and a bar mounted for longitudinal movement with respect to said car operatively connected to said lever for moving said locking member into an unlocking position.

6. In a general service car having a door, a lever pivotally connected thereto, locking members pivotally connected to said lever and movable into locking and unlocking positions by said lever, and coöperating locking members carried by the frame of the car for said locking members and lever, said door being raised individually and locked through movement of said lever.

7. In a general service car having a door, a lever pivotally connected thereto, locking members pivotally connected to said lever and movable into locking and unlocking positions by said lever, coöperating locking members carried by the frame of the car for said locking members and lever, and means for actuating said lever for moving the locking members into an unlocking position, said door being raised individually and locked through movement of said lever.

8. In a general service car having crosswise and longitudinally extending frame members, stationary locking members carried thereby, a pivotally mounted dump door, a lever pivotally connected to said door and having a handle portion, and movable locking members pivotally connected to said lever and movable into locking relationship with certain of said stationary locking members by movement of said lever, said lever also moving into a locking relationship with one of the stationary locking members, said door also being raised individually through said hand lever.

9. In a general service car having crosswise and longitudinally extending frame members, stationary locking members carried thereby, a pivotally mounted dump door, a lever pivotally connected to said door and having a handle portion, movable locking members pivotally connected to said lever and movable into locking relationship with said stationary locking members by movement of said lever, said door also being raised individually through said hand lever, and means coöperating with the lever for moving the lever and movable locking members into an unlocking position.

10. A general service car having a floor composed largely of drop doors, means for lifting one of said doors individually by hand, and means including a member movably mounted on the door for supporting the door in lifted position.

11. A general service car having a floor composed largely of drop doors, means carried by one of said doors for individually lifting said door and for permanently locking said door in closed position.

12. In a general service car having a plurality of doors, means for individually lifting said doors, and means for individually locking said doors in closed position, said locking means being operated by a movement of the lifting means.

13. A general service car having a substantially horizontal floor composed largely of doors hinged at or near the center sill of the car and dropping away from the sides of the car to discharge the load, and means for lifting said doors individually by hand and for supporting said doors in closed position.

Signed at Chicago, Illinois, this 17th day of November, 1919.

HARRY S. HART.